US 9,477,490 B2

(12) United States Patent
Liddicott (10) Patent No.: US 9,477,490 B2
(45) Date of Patent: Oct. 25, 2016

(54) MILESTONE BASED DYNAMIC MULTIPLE WATCHDOG TIMEOUTS AND EARLY FAILURE DETECTION

(71) Applicant: Dell Software Inc., Round Rock, TX (US)

(72) Inventor: Samuel Liddicott, Wafkefield West Yorkshire (GB)

(73) Assignee: DELL SOFTWARE INC., Round Rock, TX (US)

( * ) Notice: Subject to any disclaimer, the term of this patent is extended or adjusted under 35 U.S.C. 154(b) by 0 days.

(21) Appl. No.: 14/589,760

(22) Filed: Jan. 5, 2015

(65) Prior Publication Data
US 2016/0196149 A1    Jul. 7, 2016

(51) Int. Cl.
*G06F 9/46* (2006.01)
*G06F 9/44* (2006.01)
*G06F 11/34* (2006.01)

(52) U.S. Cl.
CPC ......... *G06F 9/4423* (2013.01); *G06F 11/3419* (2013.01)

(58) Field of Classification Search
None
See application file for complete search history.

(56) References Cited

U.S. PATENT DOCUMENTS

| | | | | |
|---|---|---|---|---|
| 6,212,134 B1* | 4/2001 | Yamashita | ............... | G06F 11/28 368/1 |
| 2002/0120697 A1* | 8/2002 | Generous | ................ | H04L 29/06 709/206 |
| 2002/0120791 A1* | 8/2002 | Somalwar | ........... | G06F 11/1435 719/330 |
| 2003/0226056 A1* | 12/2003 | Yip | ..................... | G06F 11/0715 714/4.1 |
| 2006/0064689 A1* | 3/2006 | Zhang | ................... | G06F 9/4881 718/100 |
| 2006/0161593 A1* | 7/2006 | Mori | .................... | G06F 19/3412 |
| 2008/0250400 A1* | 10/2008 | Vertes | .................. | G06F 9/4426 717/158 |
| 2012/0117254 A1* | 5/2012 | Ehrlich | ................. | H04L 41/142 709/228 |
| 2012/0159259 A1* | 6/2012 | Klein | .................. | G06F 11/0757 714/38.1 |
| 2013/0171986 A1* | 7/2013 | Shimizu | ................. | H04B 7/155 455/423 |
| 2015/0277867 A1* | 10/2015 | Hasabnis | ............ | G06F 9/44521 717/164 |

* cited by examiner

*Primary Examiner* — Adam Lee
(74) *Attorney, Agent, or Firm* — Polsinelli LLP (57) ABSTRACT

A dynamic, milestone-based solution for managing computer operations, as may be embodied by various systems, methods, and non-transitory computer-readable storage media, may involve analyzing a computer operation invoked by an invoking module. The solution may involve identifying and classifying discrete steps or phases within the invoked operation and applying context-specific watchdog timers and operational milestones based on the detected phases. The solution may involve monitoring the progress of the operation and terminating the operation when an operational milestone is not achieved before an applied watchdog timer expires during a given phase.

20 Claims, 4 Drawing Sheets

MILESTONE BASED DYNAMIC MULTIPLE WATCHDOG TIMEOUTS AND EARLY FAILURE DETECTION

BACKGROUND

1. Field of the Disclosure

The present disclosure concerns managing computer operations. More particularly, the present disclosure concerns a dynamic, milestone-based solution for managing computer operations.

2. Description of the Related Art

As computer technologies continue to rapidly advance, users exhibit less and less tolerance for process delays. Where at one point in time users would not bat an eye at waiting five minutes to download a digital audio file or ten minutes to configure a server, most users of today would be hard pressed to tolerate a fraction of that delay. Given that user patience has become such a limited commodity in the digital world, it is vital that any extended wait imposed on a user ultimately leads to a successful outcome. No user wants to endure an extended wait for a process to complete only to have the process fail and require another attempt. This principle is familiar even to individuals outside the computer realm. A restaurant customer, for example, may not mind waiting twenty minutes for a cooked-to-order steak. But that same customer will likely be very annoyed— and indeed may not return to the restaurant at all—if the restaurant causes him to wait the full twenty minutes before informing him that it has run out of steak.

Turning back to the computer realm, a device user will typically be much more patient with an operational delay if the operation is making progress and will ultimately succeed. Conversely, that same user will likely be annoyed if the operation is not making progress or is in an environment where it cannot succeed. For example, while attempting to configure a device in the context of a runtime network environment, a user may configure various device parameters through a device configuration interface. In order for the configuration to take effect, however, it may require a validation step. Obtaining the requisite validation may involve communication with configuration servers. In such an example, process delays may arise as the servers in the network environment attempt to read large or complex configurations. The user will typically consider such delays bearable because they eventually provide value in the form of a desired configuration. Delays may also arise, however, from a device attempting to contact a server that is not present in the network. The user will typically extend far less grace in the latter scenario because at the end of the process the user obtains no useful result. Consequently, whether users consciously recognize it or not, they prefer an operation to fail quickly if in fact it is going to fail. They are only willing to endure process delays when the process is ultimately going to succeed. The problem, however, is that it is difficult to determine in advance whether an operation will fail without first waiting for it to fail.

In one illustrative network scenario, a user can reasonably expect that a Transmission Control Protocol (TCP) connection to a server should be established in 10 seconds or less. A user can reasonably expect up to a 30-second wait as the server processes a configuration query and starts returning results. And a user can reasonably expect to wait several minutes before receiving the full results.

In such cases, a simple 30-second timeout may be too long for the TCP connection step. Users are not willing to wait 30 seconds for a connection to fail when their expectation is that it will succeed in 10 seconds or less. And yet, at the same time, a 30-second timeout may be too short when the network devices are attempting to exchange significant amounts of data over a slow network. Such scenarios result in artificial failures in which the result would have been achieved had the timeout not killed the operation early. On top of wasting valuable time, such scenarios can prevent the network environment from functioning properly. Thus, a "catch 22" exists. Reducing the timeout shortens the delay experienced by the user, but increases the risk of inducing artificial failures. Increasing the timeout reduces the risk of inducing artificial failures (i.e., by giving the operation more time to succeed), but lengthens the delay experienced by the user without providing any guarantee of success.

Previously attempted solutions have failed to adequately address the problem. One such solution involves implementing a regular tick-based watchdog. With a regular tick-based watchdog, the operation will regularly indicate that it has not deadlocked or crashed. But that solution is not suitable because it does not guarantee that the operation will make any progress. Even if the watchdog is reset only at progress points, it does not consider the fact that different phases require different length timeouts. Enabling a regular tick-based watchdog to do so would require modifying the program itself, which may affect certification of correct behaviors, violate copyright law, or be very difficult to achieve.

Another inadequate attempt to solve the problem involves providing continual monitoring of the existence of network devices and avoiding attempts to perform the operations when the network devices appear absent. That solution is sub-optimal because it requires continual generation of monitoring traffic and may fail to catch cases where network devices exist but particular services are not responsive.

Yet another inadequate attempt to solve the problem that is specific to the configuration environment involves providing a cached result from a previous configuration query. But that solution is also sub-optimal and is particularly ill-suited in a configuration environment because cached results are unreliable and can be misleading. For instance, when a user is testing a recent configuration change, the cached result will not be affected by the change. At any point an administrator might access a main controller and delete or modify configuration records. In the configuration context, it is critical that records are current (e.g., a record indicating whether or not a given device has a valid domain membership). Relying on potentially out-of-date cached results in an unreliable approach.

Further, because of the manner in which library routines and commands used in scripts encapsulate behavior, it can be difficult—if not impossible—to merely insert watchdog timers at relevant points in an operation. Retroactively integrating appropriate watchdog timers is complicated, tedious, and error-prone because it requires decomposing an operation into smaller parts and potentially introducing bugs.

Thus, there is a persistent need in the art for an improved method of managing computer operations.

SUMMARY OF THE CLAIMED INVENTION

A dynamic, milestone-based solution for managing computer operations is disclosed.

In one embodiment, a dynamic, milestone-based method for managing computer operations includes a step of executing an invoking module. The invoking module includes a plurality of executable instructions stored in memory of a computing device. Execution of the invoking module invokes a computer operation at an invoked module. The method further includes executing a monitoring engine. The monitoring engine includes a plurality of executable instructions stored in memory of the computing device. Execution of the monitoring engine applies a first watchdog timer based on a first phase of the invoked computer operation and monitors progress of the first phase. Further execution of the monitoring engine compares the progress to a first milestone associated with the first watchdog timer, terminates the operation when the operation fails to meet the first milestone before the first watchdog timer expires, and permits the operation to progress to a second phase when the operation meets the first milestone before the first watchdog timer expires.

In another embodiment, a non-transitory computer-readable storage medium has a computer program embodied thereon. The computer program is executable by a processor to perform a dynamic, milestone-based method for managing computer operations. The method includes invoking a computer operation, applying a first watchdog timer based on a first phase of the invoked computer operation. The method further includes monitoring progress of the first phase, comparing the progress to a first milestone associated with the first watchdog timer, and terminating the operation when the operation fails to meet the first milestone before the first watchdog timer expires. The method also includes applying a second watchdog timer based on the second phase of the operation, monitoring progress of the second phase, and comparing the progress of the second phase to a second milestone associated with the second watchdog timer. The method further includes terminating the operation when the operation fails to meet the second milestone before the second watchdog timer expires.

DETAILED DESCRIPTION

A dynamic, milestone-based solution for managing computer operations is disclosed. Although the novel solution is illustrated in this disclosure by way of various exemplary systems, methods, non-transitory computer-readable storage media, and network environments, it should be understood that the embodiments described herein are exemplary only and are in no way limiting. Persons of ordinary skill in the art will readily recognize and appreciate that the present disclosure suggests many other possible embodiments in addition to those expressly described herein.

The dynamic, milestone-based solution for managing computer operations, as may be embodied by various systems, methods, and non-transitory computer-readable storage media, may involve analyzing a computer operation to be performed. The solution may involve identifying discrete steps or phases within the operation and applying context-specific watchdog timers and associated operational milestones based on the detected phases. The solution may also involve monitoring the progress of the operation as the identified operational milestones are achieved.

Monitoring the operation may involve monitoring the operation either directly or by proxy (e.g., using simulated mirror operations). The solution may involve classifying the steps or phases within the operation into a plurality of different phase types. Each phase type may have a different effect on a watchdog timer associated with the operation. For instance, one phase type may be associated with resetting the watchdog timer, while another may be associated with terminating the operation. The different phase types may be associated with watchdog timers having different timeout values. For instance, in one embodiment, monitoring the operation may involve observing the operation as it proceeds through various phases, thus achieving certain operational milestones, determining a contextually appropriate timeout to apply during each phase based on the achieved milestones, and applying the determined timeout.

The dynamic, milestone-based solution described herein constitutes a significant advancement in the field of computer operation management. As discussed below in further detail, the solution cures a persistent "catch 22" problem in the art wherein managing computer operations involves being forced to choose between two undesirable options: (1) using a short standard timeout, which reduces the delay experienced by the user, but increases the risk of inducing artificial failures; and (2) using a longer standard timeout, which reduces the risk of inducing artificial failures (i.e., by giving the operation may time to succeed), but lengthens the delay experienced by the user without providing any guarantee of success. When using the dynamic solution described herein, failures—if they are going to occur—occur quickly and without halting what would otherwise be a successful operation. Too often, in the past, programmers, system administrators, and others skilled in the art have overlooked the need to fail in such a way that the failure provides value. The prevailing mindset in the art is to focus on how to succeed and how to do so quickly, rather than how to fail quickly if a failure is indeed going to occur. The fact that a logical connection may take more than a certain threshold amount of time to complete is valuable information on the state of the local network and services. Successive reattempts to avoid failure may be worthwhile for some routine operations, but there is value in reporting such failures quickly so that an administrator can respond while the network conditions that caused the failure are still present and relevant (e.g., in a network configuration setting).

Figure 1:
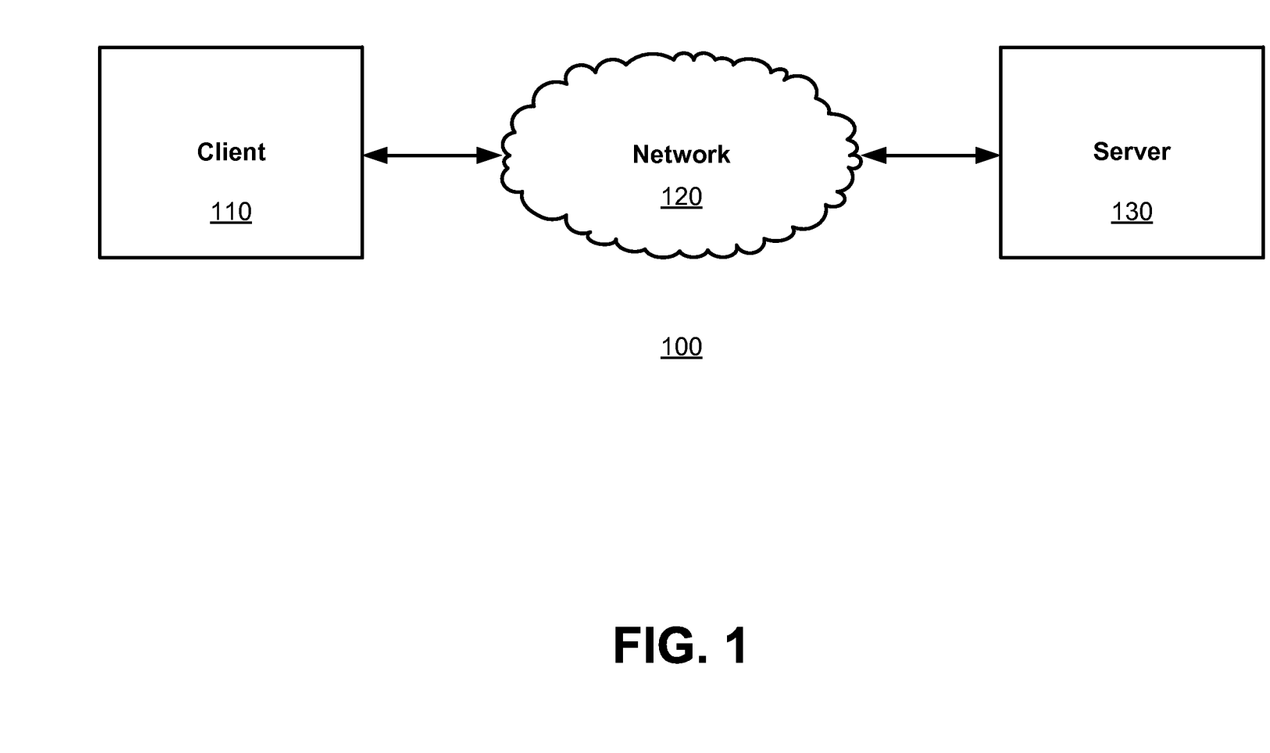
FIG. 1 is a block diagram of an exemplary network environment in which a dynamic, milestone-based solution for managing computer operations may function.

FIG. 1 is a block diagram of an exemplary network environment 100 in which a dynamic, milestone-based solution for managing computer operations may function. The environment may include a client device 110 communicatively coupled to a communications network 120. The client device 110 may be communicatively coupled to a server 130 through network 120 (and in some cases numerous intermediate computing devices as warranted by the structure and purpose of network environment 100).

Network 120 may be implemented as a private network, a public network, an intranet, the Internet, or any suitable combination of the foregoing. Although FIG. 1 illustrates certain computing devices communicatively coupled to network 120, i.e., client device 110 and server 130, persons of ordinary skill in the art will readily recognize that FIG. 1 is merely illustrative and that, in practice, the solution described herein may function in any number of varying network environments.

Client device 110 may be a computing device, such as a desktop computer, workstation, laptop, smartphone, tablet, or other suitable computing device. Client device 110 may be communicatively coupled to network 120 at a network interface and may be coupled either directly to network 120 or through any number of intermediate network servers, gateways, or other suitable computing devices. The various functionalities described below may be distributed as a system across multiple devices communicatively coupled by a network.

Figure 2:
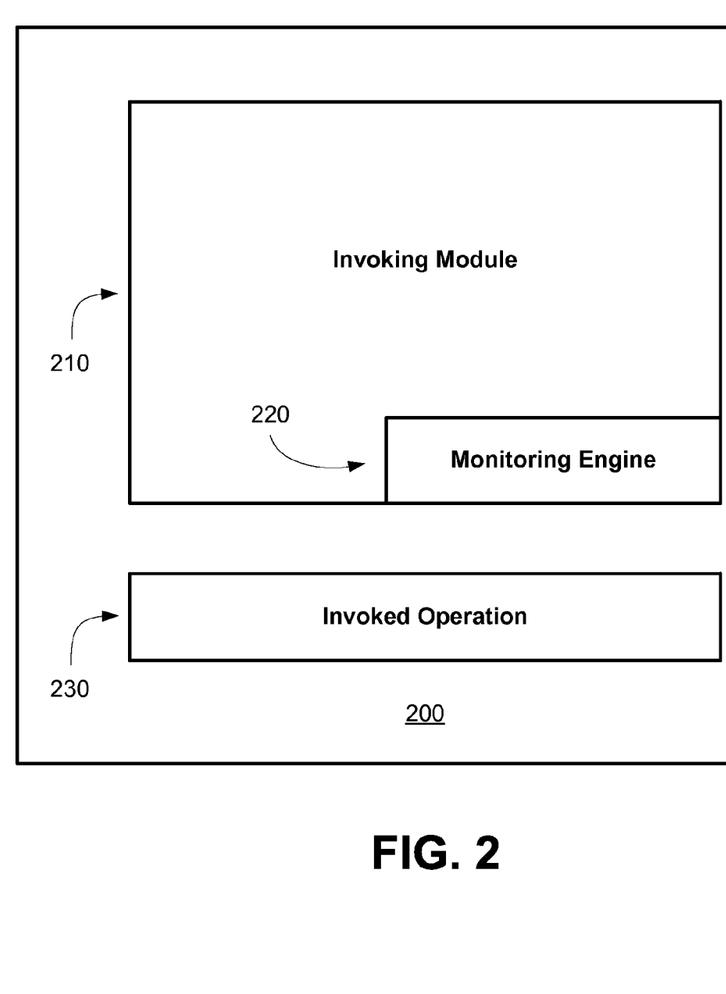
FIG. 2 is a block diagram of an exemplary application.

FIG. 2 is a block diagram of an exemplary application 200 stored in memory of client device 110. Application 200 may also be stored in memory of server 130 or another computing device. Application 200 may include a plurality of objects or modules, each of which may be responsible for effectuating one or more functionalities that contribute to the provision of a dynamic, milestone-based solution for managing computer operations. Each module may include both a data model associated with a particular functionality and executable computer instructions that, when executed, effectuate the functionality.

As shown in FIG. 2, application 200 may include an invoking module 210, a monitoring engine 220, and an invoked operation 230. Invoking module 210 may include executable instructions that, when executed by a processor of client device 110, invoke a particular computer operation 230 needed by application 200.

Monitoring engine 220 may include executable instructions that, when executed by a processor of client device 110, effectuate functionality concerning monitoring the activity (e.g., progress or lack thereof) of invoked operation 230. Monitoring engine 220 may be a sub-module of invoking module 210, or it may be its own distinct and separate module within application 200. Alternatively, monitoring engine 220 may be a module of a separate and distinct application stored in memory of client device 100, or it may be stored in memory of an altogether separate and distinct device that is communicatively coupled to client device 110 over network 120. Monitoring engine 220 may be written in any suitable programming language, such as shell scripts, Java, C, and the like. If written in C, monitoring engine 220 may be integrated within invoking module 210 as an alarm. Where monitoring engine 220 is distinct from invoking module 210, monitoring engine 220 may be created using a fork function available in Unix. Alternatively, monitoring engine 220 may be created via multi-threading.

Invoked operation 230 may include executable instructions that, when executed by a processor of client device 110, perform a particular computer operation requested by invoking module 210. As shown in FIG. 2, invoked operation 230 may reside within an independent module within application 200. In some embodiments, invoked operation 230 may reside within a separate and distinct application stored in memory of client device 110. Alternatively, invoked operation 230 may reside on a separate and distinct device that is communicatively coupled to client device 110 over network 120.

Persons of ordinary skill in the art will readily recognize that the foregoing modules, including the relationships between the illustrated modules, are exemplary in nature and that application 200 may include any number of other modules depending on the anticipated needs of client device 110 or the structure of the network environment in which client device 110 operates. Moreover, although exemplary relationships between the modules have been illustrated, persons of ordinary skill in the art will appreciate that many other possible variations are possible. The relationship between the modules in any given embodiment will depend on the overall purpose of invoking module 210, the identity and nature of invoked operation 230, and various design considerations and preferences exercised within the discretion of the system designer (e.g., whether to use shell scripts or C).

Figure 3:
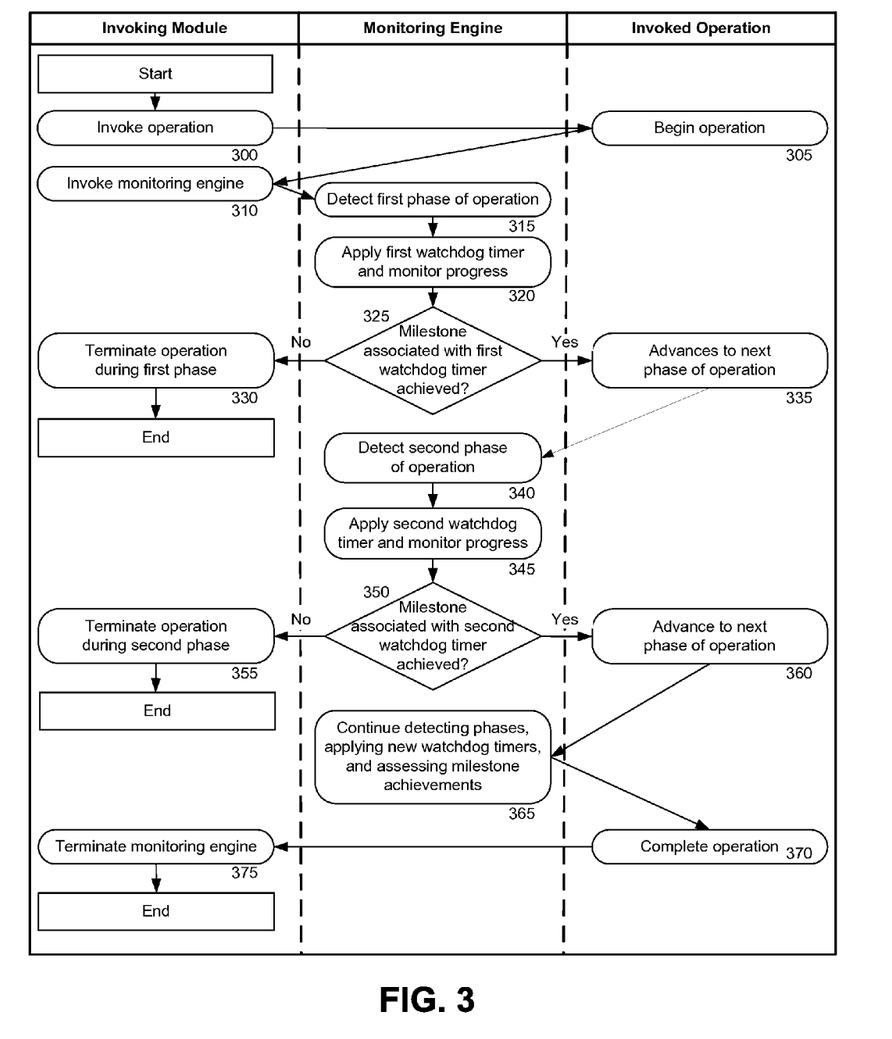
FIG. 3 is a flow diagram of an exemplary dynamic, milestone-based method for managing computer operations.

FIG. 3 is a flow diagram of an exemplary dynamic, milestone-based method for managing computer operations. The exemplary method shown in FIG. 3 may be carried out in the context of the network environment depicted in FIG. 1 and the exemplary application depicted in FIG. 2.

Beginning at block 300, the method may include executing invoking module 210 depicted in FIG. 2. Invoking module 210 may include a plurality of executable instructions stored in memory of a computing device, such as client device 110 depicted in FIG. 1. Execution of invoking module 210 may invoke a particular computer operation needed by invoking module 210 in the context of application 200 (e.g., invoked operation 230 shown in FIG. 2). At block 305, invoked operation 230 of FIG. 2 may begin performing the specified computer operation. At block 310, the method may include executing a monitoring engine, such as monitoring engine 220 of FIG. 2. Monitoring engine 220 may include a plurality of executable instructions stored in memory of the computing device, which may be the same computing device upon which invoking module 210 is stored (client device 110, in this example) or a separate computing device communicatively coupled to the computing device upon which invoking module 210 is stored.

Upon executing, monitoring engine 220 may detect a first phase of invoked operation 230 as shown at block 315. In some embodiments, the first phase may be assumed to occur at the moment invoked operation 230 is invoked. For instance, where invoked operation 230 is downloading a file from a server, the first phase detected (or assumed) by monitoring engine 220 may be establishing a TCP connection with the server. A second phase following the first phase may be a data exchange phase. At block 320, monitoring engine 220 may apply a first watchdog timer based on the detected (or assumed) first phase. Applying the first watchdog timer based on the first phase may include a step of classifying the first phase based on the operational step occurring during the first phase. For instance, the method may include recognizing the first phase as including operations necessary to establish a TCP connected with the server.

After classifying the first phase, the method may further include selecting a first watchdog timer based on the classification associated with the first phase. The method may include comparing the recognized operations to a table of stored operations that each correlate to a predetermined classification of watchdog timer. Each watchdog timer may be associated with a specific condition or milestone that must be met before the watchdog timer expires. For instance, where the first phase of invoked operation 230 is establishing a TCP connection with a server, the table may identify a 10-second timeout as the appropriate watchdog timer. The table may identify the associated condition or milestone as successfully establishing the connection with the server. The table may be maintained in a database stored in memory of a computing device, which may be client device 110 or a separate and distinct computing device communicatively coupled to client device 110. Applying the first watchdog timer may further include activating the selected first watchdog timer.

A block 320, the method may further including monitoring the progress of the first phase. At block 325, the method may include comparing any progress detected in real-time to the first condition or milestone associated with the selected and applied first watchdog timer. As shown at block 330, the method may include terminating invoked operation 230 when the milestone associated with the first watchdog timer is not achieved before the first watchdog timer expires. Referring back to the above example, for instance, the method may include terminating the file download operation when the real-time monitoring of the first phase—establishing the TCP connection—reveals that the milestone associated with the first watchdog timer—successfully establishing the TCP connection—is not achieved before the 10-second watchdog timer expires.

At block 335, the method may include permitting invoked operation 220 to advance to a next operational phase (e.g., a second phase) when invoked operation 220 in fact meets the milestone associated with the first watchdog timer before the first watchdog timer expires. In the above example, the second phase may be a data exchange phase in which the file is downloaded from server 130 to client device 110 over network 120. As shown at steps 340 through 365, the method may include repeatedly performing the foregoing steps of detecting the active phase, selecting and applying an appropriate watchdog timer (which may be associated with an appropriate condition or milestone), and determining that the relevant milestone is either achieved or not achieved before the selected watchdog timer expires. In each case, the choice of the watchdog timer depends heavily on the active phase being monitored and the role and importance of invoked operation 230 within the greater context of invoking module 210 and application 200.

The method for managing computer operations described herein is dynamic and milestone-based at a minimum because it accounts for the fact that different phases may require different watchdog timers and different milestones. The requirement that different phases be subjected to different watchdog timers may stem from differing user tolerances in different situations. The term "dynamic" reflects the fact that the method detects and classifies phases, monitors progress, and applies a suitable watchdog timer and associated condition or milestone on the fly and based on the substance and context of the detected and classified active phase.

Referring again to the above example, for instance, a user may not be willing to wait longer than 10 seconds for client device 110 to establish a TCP connection with server 130 before finding out that there is a problem with network 120. Accordingly, a 10-second watchdog timer with a condition or milestone of connection success may be appropriate for the first phase. At the same time, a 10-second watchdog timer may be inappropriate for the second phase—the data exchange phase—based on that same user's willingness to wait longer once he or she has been assured that a connection has been established and the data exchange phase is underway. Accordingly, the second phase may instead merit a 30-second watchdog timer with a condition or milestone of 95% download completion. A watchdog timer, such as the foregoing 30-second watchdog timer, may require that a phase is completed in whole (e.g., achieved connection is established), completed in part (e.g., at least 1K of data must be returned), or require that any number of other possible conditions or milestones are met to prevent termination of the operation when the watchdog timer expires.

Because the method described herein is dynamic and applies successive, appropriately selected watchdog timers that account for the context in which they are governing an invoked operation, it solves the "catch 22" problem described above and constitutes a significant advance in the field of managing computer operations. By monitoring the progress of an operation through various phases and dynamically applying watchdog timers appropriate for the particular circumstances of each phase, the solution grants a long collective timeout to an operation making progress, while granting a short collective timeout to an operation failing to make progress. In doing so, the method permits users to turn what would otherwise be mere failures into failures that deliver valuable information (e.g., if there is a high likelihood that an invoked operation is going to fail out of the gate because of network problems, it will fail quickly so that the user becomes aware of the underlying problem with the network).

Referring back to block 335, when invoked operation 230 advances to a second operational phase, the method may include detecting the second phase at block 340. The method may further include, at block 345, applying a second watchdog timer and monitoring progress of the second phase as described above. Applying the second watchdog timer may include steps of classifying the second phase based on the operational step occurring during the second phase, selecting the second watchdog timer based on the classification associated with the second phase, and activating the second watchdog timer.

When the milestone associated with the second watchdog timer is not achieved before the watchdog timer expires, the method may include terminating invoked operation 230 (as shown at block 355). In some embodiments, monitoring engine 220 may report the failure to invoking module 210, which may then terminate invoked operation 230. In other embodiments, monitoring engine 220 may directly terminate invoked operation 230.

As shown at block 360, the method may include permitting invoked operation 360 to advance to a further phase of the operation. As illustrated at block 365, the method may include detecting and monitoring progress of as many new phases (and selecting and applying as many phase-dependent watchdog timers) as invoked operation 230 progresses through until it concludes. A third phase, for instance, may be an operational phase in which invoked operation 200 is brought to an organized conclusion and the connection is closed. The selected watchdog timer may specify that, during the third phase, the watchdog timer will permit up to 300 seconds for the connection to be closed or, alternatively, up to 30 seconds to elapse without having received any data. At block 370, when invoked operation 230 concludes, the method may include preventing any further monitoring. Preventing any further monitoring may include deactivating or terminating monitoring engine 220 (as shown at block 375).

Monitoring the various phases of invoked operation 230 may include a variety of suitable processes that examine one or more process outputs or side effects. Some illustrative and non-restrictive examples include: examining process messages (e.g. at Standard Out or Standard Error), examining log messages, detecting when invoked operation 230 creates a predetermined file (e.g., a temporary file), detecting when the computing device has received a predetermined threshold level of data associated with a file being received, examining kernel activity (e.g., examining syscalls using a ptrace function), examining packet traffic (e.g., for the presence or absence a predetermined packet), intercepting a library function call made by the invoked operation, analyzing activity using debug mode, or performing and analyzing the outcome of a plurality of operations that mirror the operations performed by invoked operation 230.

Monitoring progress may include examining process messages at, for example, Standard Out or Standard Error. As persons of ordinary skill in the art will readily recognize, Standard Out and Standard Error are message output streams utilized in most computer operations. Examining the process messages may include reading messages at Standard Out in real-time as they appear. Examining the process messages may include looking for certain key messages that indicate the operation is making progress. In an exemplary operation, for example, a device may connect to a server to download a file. The operation may include multiple phases. The first phase may include receiving a start command and sending connection credentials to the server, which may result in a message that reads, "connecting to <server name>" at Standard Out or Standard Error. Once the operation has successfully established a connection with the server, it may output another progress message at Standard Out or Standard Error indicating that the first phase has been completed (e.g. "connected."). The operation may then move into a second phase in which it fetches a specified file. To reflect that transition, the operation may out another progress message at Standard Our or Standard Error, such as "fetching <file name>." Monitoring progress may, in the above example, include reading the messages at Standard Out or Standard Error. In many cases, such messages normally would have been displayed to a user by a user interface, thus allowing the user to observe that the operation is making progress and avoid getting impatient or attempting to prematurely abort or reset the operation.

Monitoring progress may also include examining log messages. In some embodiments, examining log messages may include examining log messages recorded by an integrated logger residing on client device 110. In other embodiments, examining log messages may include examining messages produced by a separate logger residing on a distinct computing device communicatively coupled to client device 110 over network 120. The log messages may have been recorded using standard techniques such as SysLog or the Windows Event Log. Alternatively, the log messages may have been recorded to a simple log file where client device 110 outputs error messages. Or, in some instances, the log messages may be viewed within a debug log file generated during verbose debug mode. The specific manner in which log messages are examined ultimately turn on the nature of client device 100 and application 200. Thus, persons of ordinary skill in the art will readily appreciate that any number of suitable log message examination techniques may be used.

Monitoring progress may include detecting a predetermined file or process side effect created by invoked operation 230 being monitored. The predetermined file may be a temporary file, for example, while a predetermined process side effect may be the creation of a directory. The fact that invoked operation 230 created a temporary file during a particular phase may be indicative of operational progress. Referring again to the exemplary invoked operation in which the operation is a file download, a predetermine process side effect indicative of progress may be the creation of a filename associated with the file. During a first phase in which client device 110 must establish a TCP connection to server 130 over network 120, for instance, detecting the creation of the filename may indicate that the connection has been successfully established. Thus, the method may include inferring that a requisite condition or milestone associated with a particular watchdog timer is achieved based on such the detection of a process side effect. Similarly, detecting that the file has appeared in at a predetermined threshold level (e.g., 1 kb of data) may indicate that the operation has successfully entered the data exchange phase.

Monitoring progress may include examining kernel activity. In some embodiments, examining kernel activity may include the use of ptrace or other syscall type process monitors. Because every operation that can be performed by the kernel on behalf of application 200 has a corresponding syscall, utilizing syscall may permit the detection and analysis of anything invoked operation 230 has asked the kernel to do, including file creation operations, network traffic activity, memory map requests, and the like. The kernel also performs its own internal operations on behalf of hardware drivers. Ptrace is a standard interface or technique that the Unix kernel provides for monitoring kernel activity. Monitoring kernel activity may be particularly useful where detecting process messages (e.g., at Standard Out or Standard Error) is not an option.

Additionally, monitoring progress may include examining real-time packet traffic. Doing so may include examining packet traffic for the presence or absence of a predetermined packet. Alternatively, examining packet traffic may include comparing characteristics of real-time packet traffic to an expected packet traffic data associated with invoked operation 230. Examining packet traffic may further include detecting aggregate patterns in packet traffic.

Monitoring progress may further include intercepting one or more library function calls made by invoked operation 230. Intercepting a library function call may include the use of LD_PRELOAD or other runtime or compile time linking techniques. For instance, intercepting a library function call may include creating a mirror library that includes the same functions present in a standard library used by invoked operation 200. Intercepting the library function may further include specifying the mirror library during preload such that function calls made by invoked operation 230 are sent to the mirror library instead of the standard library used by invoked operation 230. Intercepting the library function further may further include receiving a function call from the invoked operation, determining a level of progress made by invoked operation 230 based on the received function call, and then passing the function call to the standard library used by the invoked operation. The foregoing approach enables monitoring engine 220 to detect what standard operations being called by invoked operation 230 (and when they are being called). Monitoring progress by intercepting one or more library function calls may be particularly useful given that there are many operations that a given application can perform without making syscalls.

Monitoring progress may also include using a debugger to intercept certain syscall or library operations and inferring a level of progress made by invoked operation 230 based on the intercepted operations. The foregoing method may be particularly useful when the source code for a given invoked operation is not readily accessible.

Monitoring progress may also include performing a plurality of mirror operations and interpreting the results to infer progress made by the actual invoked operation 230 being monitored. For instance, monitoring progress may include performing a mirror operation identical to invoked operation 230 (or identical to a function being performed by invoked operation 230), monitoring progress of a first phase of the mirror operation, and deeming the progress of the mirror operation as identical to progress of the invoked operation.

In an example where invoked operation 230 has been asked to make a connection to a certain service, for example, monitoring progress by using mirror operations may include monitoring engine 220 itself creating a temporary connection to the same service while invoked operation 230 runs. In doing so, monitoring engine 220 may assume that the same success or failure it experiences will match that of the invoked operation 230 being monitored.

In yet another illustrative example, invoked operation 230 may have been invoked to fetch a file. In such a case, performing a mirror operation may include simulating a connection to the server containing the file. For instance, performing the mirror operation may include resolving the domain name into the IP address associated with client device 110 and assuming that, if the resolution step was successful within a predetermined time frame (e.g., 15 seconds), then it likely did for invoked operation 230 as well.

In a further step, performing a mirror operation may include simulating a connection to a specified port. Doing so may include sending SYN packets and waiting for a return SYN_ACK acknowledgement. Performing the mirror operation may include inferring that, if a SYN_ACK is returned in response to sending a SYN packet during a mirror operation, then the invoked operation 230 is likewise progressing in the same manner.

Monitoring progress by performing mirror operations produces unexpectedly successful results. The use of mirror operations requires a step of assuming that whatever is occurring for monitoring engine 220 is identical or at least substantially close to what is happening in real-time for invoked operation 230. Given that necessary leap and the fact that there is no concrete guarantee that the assumption is always correct, many persons of ordinary kill in the art would be inclined to discount the likelihood that the monitoring step is accurate. In practice, however, the assumption turns out to be very useful because it is accurate a vast majority of the time and, when it is not accurate, there are usually overarching problems in the network environment anyway. Thus, the percentage of the time when the assumption is not accurate is low and has insignificant impacts on the utility of using mirror operations when monitoring the progress of a particular operational phase. Moreover, if a given mirror operation fails while invoked operation 230 being mirrored continues successfully, the active watchdog timer may still ultimately result in termination of invoked operation 230. Even in such circumstances, the process conveys valuable information about the unreliability of the network environment. Namely, the success or failure of mirror operations and invoked operations are closely correlated in reliable network environments.

The above ways in which operational progress may be monitored are merely illustrative. Persons of ordinary skill in the art will readily recognize that other monitoring and detection techniques may be appropriate for use with the methods described herein. In some embodiments, the method may include a combination of some or all of the foregoing methods of monitoring progress (e.g., for optimal monitoring, redundancy, etc.) The step of monitoring progress may also occur in embodiments in which monitoring engine 220 is directly linked to invoking operation 230. In such cases, invoked operation 230 may have been specifically designed to be monitored by its invoker through a progress or status API and, as such, may be directly monitored by monitoring engine 220.

As is clear from the above description, a dynamic, milestone-based solution for managing computer operations, as may be embodied by various systems and methods, has been disclosed. The foregoing methods may be performed by an executable computer program (e.g. application 200 of FIG. 2) embodied on a non-transitory computer-readable storage medium.

The foregoing method may also be used to manage hardware operations in the same manner described above. For instance, monitoring progress of a hardware device, such as a hard disk, may include detecting the presence of a status indicating LED with a web cam, a sound card equipped to detect interference, or another suitable detection mechanism.

Figure 4:
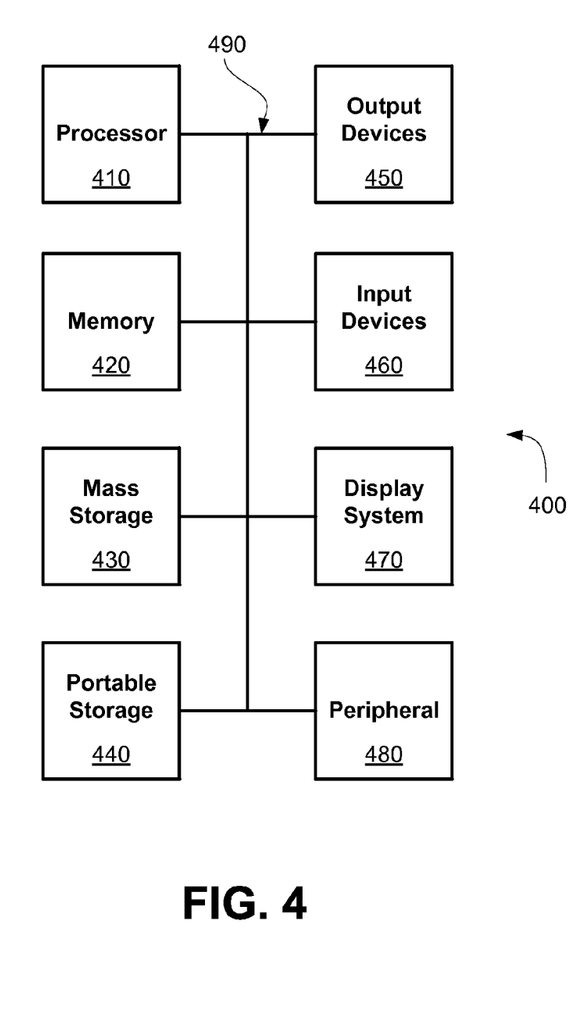
FIG.4 is a block diagram of an exemplary system for implementing a computing device.

FIG. 4 is a block diagram of an exemplary system for implementing a computing device. The system 400 of FIG. 4 may be implemented in the context of client device 110, communication network 120, and server 130 of FIG. 1. The computing system of FIG. 4 may include one or more processors 410 and memory 420. Main memory 420 may store, in part, instructions and data for execution by processor 410. Main memory 420 may store the executable code when in operation. Computing system 400 may further include a mass storage device 430, a portable storage medium drive 440, output devices 450, user input devices 460, a graphics display system 470, and one or more peripheral devices 480.

The components shown in FIG. 4 are depicted as being connected via a single bus 490. The components may alternatively be connected through one or more data transport means. Processor 410 and main memory 420, for example, may be connected via a local microprocessor bus. Mass storage device 430, peripheral device(s) 480, portable storage device 440, and display system 470 may be connected via one or more input/output buses.

Mass storage device 430, which may be implemented with a magnetic disk drive or an optical disk drive, may be a non-volatile storage device for storing data and instructions for use by processor 410. Mass storage device 430 may store system software for implementing embodiments of the network-based solution described herein for purposes of loading the software into main memory 420.

Portable storage device 440 may operate in conjunction with a portable non-volatile storage medium, such as a compact disk or digital video disc, to input and output data and code to and from computer system 400. The system software for implementing embodiments of the present network-based solution may be stored on such a portable medium and input to computer system 400 via portable storage device 440.

Input devices 460 may provide a portion of a user interface. Input devices 460 may include an alpha-numeric keypad, such as a keyboard, touch screen, or touchpad, for inputting alpha-numeric and other information, or a pointing device, such as a mouse, a trackball, stylus, or cursor direction keys. Additionally, system 400 may include output devices 450, such as speakers, printers, network interfaces, monitors, and the like.

Display system 470 may include a liquid crystal display or other suitable display device. Display system 470 may receive textual and graphical information and may process the information for output to the display device.

Peripherals 480 may include any type of computer support device to add additional functionality to computer system 400. Peripheral device 480 could be, for example, a modem or a router.

The components illustrated in computer system 400 of FIG. 4 are those typically found in computer systems that may be suitable for use with embodiments of the presently described solution. The depiction of such components is not intended to be exhaustive in nature, but is rather intended to represent a broad category of computer components that are well known in the art. Thus, system 400 may be a desktop computer, workstation, server, mainframe computer, laptop, tablet, smartphone or other mobile or hand-held computing device, or any other suitable computing device. Computer system 400 may also include various bus configurations, networked platforms, multi-processor platforms, etc. Various operating systems may be used, such as Unix, Linux, Windows, Macintosh OS, Palm OS, and other suitable operating systems.

As explained above, the dynamic, milestone-based solution described herein constitutes a significant advancement in the field of managing computer operations. Because the method described herein is dynamic and applies successive, appropriately selected watchdog timers that account for the context in which they are governing an invoked operation, the solution cures a persistent "catch 22" problem in the art. Prior to the introduction of the presently described methods, the "catch 22" forced those who manage computer operations to choose between two undesirable options: (1) using a short standard timeout, which reduces the delay experienced by the user, but increases the risk of inducing artificial failures, and (2) using a longer standard timeout, which reduces the risk of inducing artificial failures (i.e., by giving the operation may time to succeed), but lengthens the delay experienced by the user without any guarantee of success. By monitoring the progress of an operation through various phases and dynamically applying timeouts appropriate for the particular circumstances of each phase, the solution grants a long collective timeout to an operation making progress, while granting a short collective timeout to an operation failing to make progress. Thus, when using the dynamic solution described herein, failures—if they are going to occur—occur quickly and without halting what would otherwise be a successful operation. In doing so, the solution permits users to turn what would otherwise be mere failures into failures that deliver valuable information.

The foregoing detailed description has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to enable others skilled in the art to best utilize the technology in various embodiments and with various modifications as suited to the particular use contemplated. It is intended that the scope of the technology be defined by the claims appended hereto.

What is claimed is:

1. A dynamic, milestone-based method for managing a plurality of computer operations, the method comprising:
    executing an invoking module, the invoking module including a plurality of executable instructions stored in a memory of a computing device, wherein executing the invoking module invokes a computer operation of the plurality of computer operations; and
    executing a monitoring engine, the monitoring engine including a plurality of executable instructions stored in the memory of the computing device, wherein executing the monitoring engine:
        classifies a first phase of the invoked computer operation;
        selects a first watchdog timer, a first watchdog timer timeout value, and a first milestone for the first phase based on the classification of the first phase and a priority of the invoked computer operation;
        activates the first watchdog timer;
        monitors progress of the first phase;
        compares the progress to the first milestone;
        terminates the operation when the progress fails to meet the first milestone before the first watchdog timer reaches the timeout value; and
        permits the operation to progress to a second phase when the progress meets the first milestone before the first watchdog timer reaches the timeout value.

2. The method of claim 1, wherein further execution of the monitoring engine:
    classifies a second phase of the invoked computer operation;
    selects a second watchdog timer, a second watchdog timer timeout value, and a second milestone for the second phase based on the classification of the second phase and the priority of the invoked computer operation;
    activates the second watchdog timer;
    monitors progress of the second phase;
    compares the progress of the second phase to the second milestone; and
    terminates the operation when the progress of the second phase fails to meet the second milestone before the second watchdog timer reaches the second watchdog timeout value.

3. The method of claim 1, wherein further execution of the invoking module deactivates the monitoring engine when the operation completes.

4. The method of claim 1, wherein monitoring progress of the first phase includes examining process messages.

5. The method of claim 4, wherein examining process messages includes examining process messages at Standard Out or Standard Error.

6. The method of claim 1, wherein monitoring progress of the first phase includes examining log messages.

7. The method of claim 1, wherein monitoring progress of the first phase includes detecting when the operation creates a predetermined file.

8. The method of claim 7, wherein the predetermined file is a temporary file.

9. The method of claim 1, wherein monitoring progress of the first phase includes detecting when the computing device has received a predetermined threshold level of data of a file being received.

10. The method of claim 1, wherein monitoring progress of the first phase includes examining kernel activity.

11. The method of claim 10, wherein examining kernel activity includes examining syscalls using a ptrace function.

12. The method of claim 1, wherein monitoring progress of the first phase includes examining packet traffic.

13. The method of claim 12, wherein examining packet traffic includes analyzing packet traffic for the presence of a predetermined packet.

14. The method of claim 12, wherein examining packet traffic includes analyzing packet traffic for the absence of a predetermined packet.

15. The method of claim 12, wherein examining packet traffic includes comparing characteristics of real-time packet traffic to an expected packet traffic data of the invoked operation.

16. The method of claim 1, wherein monitoring progress of the first phase includes intercepting a library function call made by the invoked operation.

17. The method of claim 16, wherein intercepting the library function call includes:
    creating a mirror library that includes the same functions present in a standard library used by the invoked operation;

specifying the mirror library during preload such that function calls made by the invoked operation are sent to the mirror library instead of the standard library used by the invoked operation;

receiving a function call from the invoked operation;

determining a level of progress made by the invoked operation based on the received function call; and passing the function call to the standard library used by the invoked operation.

18. The method of claim 1, wherein monitoring progress of the first phase includes using debug mode.

19. The method of claim 1, wherein monitoring progress of the first phase includes:

performing a minor operation identical to the invoked operation;

monitoring progress of a first phase of the minor operation; and deeming the progress of the mirror operation as identical to progress of the invoked operation.

20. A non-transitory computer-readable storage medium having a computer program embodied thereon, the computer program executable by a processor to perform a dynamic, milestone-based method for managing a plurality of computer operations, the method comprising:

invoking a computer operation of the plurality of computer operations;

classifying a first phase of the invoked computer operation;

selecting a first watchdog timer, a first watchdog timer timeout value, and a first milestone for the first phase based on the classification of the first phase and a priority of the invoked computer operation;

activating the first watchdog timer;

monitoring progress of the first phase;

comparing the progress to the first milestone;

terminating the operation when the progress fails to meet the first milestone before the first watchdog timer reaches the timeout value; and when the progress meets the first milestone before the first watchdog timer reaches the timeout value:

classifying a second phase of the invoked computer operation;

selecting a second watchdog timer, a second watchdog timer timeout value, and a second milestone for the second phase based on the classification of the second phase and the priority of the invoked computer operation;

activating the second watchdog timer;

monitoring progress of the second phase;

comparing the progress of the second phase to the second milestone; and terminating the operation when the progress of the second phase fails to meet the second milestone before the second watchdog timer reaches the second watchdog timeout value.

\* \* \* \* \*